Figure 1A:
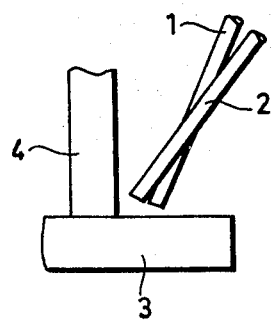

March 2, 1965   CARL-ERIC LINNANDER   3,171,944
METHOD OF SUBMERGED ARC WELDING OF FILLET WELDS
Filed March 21, 1963

3,171,944
METHOD OF SUBMERGED ARC WELDING
OF FILLET WELDS
Carl-Eric Linnander, Gothenburg, Sweden, assignor to Pullmax Aktiebolag, Gothenburg, Sweden, a corporation of Sweden
Filed Mar. 21, 1963, Ser. No. 267,032
Claims priority, application Sweden, Mar. 27, 1962, 3,365/62
6 Claims. (Cl. 219—137)

The present invention refers to a method of submerged arc welding of fillet welds. Larger size fillet welds are, as is well known, most readily welded downhand or flat positioned, that is, in such a position that the bisector of the angle between the workpieces is vertical and the surface of the weld will lie in a horizontal plane. However, in many cases welding in standing position (that is, with one workpiece vertical) cannot be avoided. The weld is then built up of two or more superposed beads, each bead being cleaned from slag before the next pass is started. The method is time consuming and, in addition, it has certain technical disadvantages, i.a. that the shrinking of the weld metal, repeated for each bead, causes large deformations and shrinking stresses in the workpieces.

The principal object of the present invention is to provide an improved method of welding standing fillet welds by the submerged arc welding process. The method according to the invention is characterized by the combination of the following measures:

(a) The weld is built up by several beads whereof the first is deposited exclusively or dominantly on the horizontal workpiece and one or more following beads are deposited in such a way that they fill up the corner between the first bead and the vertical workpiece.

(b) The welding is carried out in one step by means of two or more simultaneously operating electrodes moved along one after the other, the slag being allowed to remain on the weld until all the electrodes have passed.

(c) The spacing of the electrodes is adjusted in such a way that the weld metal deposited by a preceding electrode has solidified completely or almost completely but is still glowing when it begins to be affected by the following electrode. Preferably the spacing is adjusted in such a way that the arc zone of the subsequent electrode encounters a slag, not yet solidified, from the welding spot ahead.

This method enables the weld to be completed in one step at a speed of 1 or 2 meters length of weld per minute and with a minimum of deformation of the welded article. The weld gets good mechanical properties and shows no tendency to welding cracks or gas pockets.

The method according to the invention is primarily intended for welding such larger fillet welds (having a throat exceeding 5.5 mm.) which cannot be carried out at all by means of one bead only when welding in standing position. However, in certain cases the method may be applied to advantage also in welding smaller fillet welds (throat 5.5 mm. or less) as it allows a higher welding speed than is possible when welding a single bead.

Figure 1:
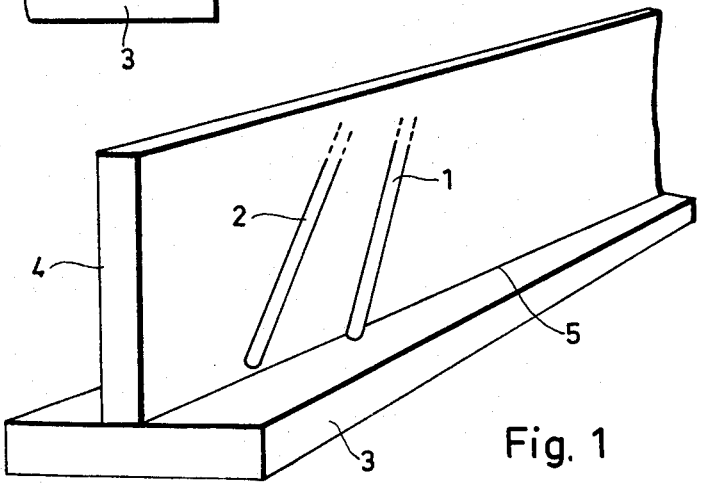
Figure 2:
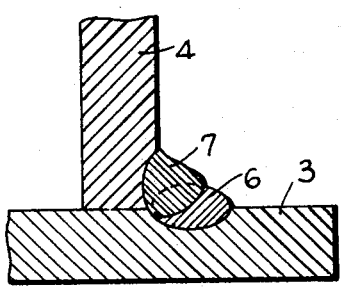
Figure 3:
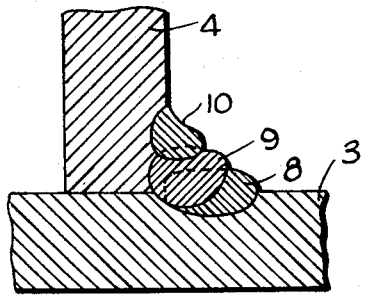

The invention will now be explained in greater detail with reference to the accompanying drawing in which FIG. 1 is an explanatory sketch illustrating the orientation of the electrodes in relationship to one another and the workpiece in carrying out the method according to the invention. FIG. 1a shows the same device as FIG. 1 as seen from the rear (that is, from that end where the welding starts). FIGS. 2 and 3 are cross sections through fillet welds built up of two and three beads respectively, by using the method according to the invention.

The two electrodes designated 1 and 2 are moved along the weld at a constant speed in a direction from the viewer FIGS. 1 and 1a and at a constant distance apart. The electrodes with appurtenant devices for feed and current supply may be disposed, for instance, on a common carriage which is moved along the workpieces. It is also possible to arrange the electrodes stationary and move the workpieces past them. The electrodes are fed towards the workpiece in known manner by means of individual automatic feeding devices which may be adapted to maintain a constant rate of feed, or a constant arc voltage. The leading electrode 1 is directed towards a point on the horizontal plate 3 at such a distance from the vertical plate 4 that a bead 6 is deposited by the electrode exclusively or dominantly on the horizontal plate 3 (cf. FIG. 2) so as to form a channel between the bead and the vertical plate electrode 2 is directed towards a point on or adjacent the edge or corner 5 and is held, as most clearly seen from FIG. 1a, at a greater angle in relation to the vertical plane than the leading electrode for the purpose of causing a bead 7 of the weld metal from this electrode to be deposited in the channel between the first bead and the vertical plate. If more than two weld beads are to be used, for example, three as shown in FIG. 3, a first bead 8 is deposited on the horizontal member 3 so as to form a channel between the bead and the vertical member 4, a second bead 9 is then deposited in the channel so as to form a corner recess with the vertical member 4 and a third bead 10 is deposited in this corner recess.

The electrodes may be connected to separate sources of welding current, or to one and the same source. In the latter case the current source should have a terminal voltage substantially independent of the current load in order to prevent an undesired coupling between the welding current circuits. Preferably each of the electrodes is fed by its own D.C. current source, the leading electrode 1 being connected to the positive pole and the trailing electrode 2 to the negative pole. As a matter of fact this arrangement will make it easier to bring about the balance between penetration and melting for the two electrodes, which balance is necessary for obtaining a uniform weld with a good connection to the base material. For the same reason it is also advisable to choose the amperage for the trailing electrode somewhat lower than that for the leading electrode. As a rule a suitable amperage for the trailing electrode is about 85% of the amperage of the leading electrode.

In the method according to the invention both, or all, of the welding zones of the electrodes must be covered, in accordance with the principle of the submerged arc welding process, by a powder layer of such a thickness that its top layer remains unmelted. Therefore it might be suitable or necessary to provide a powder supply not only in front of the leading electrode but also between the electrodes.

In order to exemplify the method according to the invention the following data may be given. They have been applied in producing a fillet weld according to FIGS. 1 and 2 having a throat of 8 mm. (plate thickness 20 mm.). Welding speed was 1 m./min. Both electrodes consisted of 4 mm. steel wire.

| Electrode No. | Amperage (A) | Arc Voltage (V) | Polarity | Inclination (angle to the vertical), degree |
|---|---|---|---|---|
| 1 | 750 | 34 | Plus | 25 |
| 2 | 650 | 30 | Minus | 35 |

The spacing of the electrodes in the longitudinal direction of the weld was 80 mm. corresponding to an interval of about 5 seconds between the passages of the two electrodes across one and the same point on the workpiece. Under the given conditions this interval was sufficient to prevent the melting pools of the separate electrodes from flowing together.

The invention also contemplates the possibility of using, instead of the individual electrodes each depositing its own bead, groups of at least two electrodes operating on a common pool. Several advantages may be gained hereby. At coarser dimensions and the large electric power caused thereby conditions may be more readily controlled if the power or current for each welding pool is divided between several electrodes. In particular this applies to the leading pool to which the largest electric power is supplied. In addition, one gets better possibilities of distributing the deposited metal in the desired manner. Using several co-operating electrodes per welding pool further offers specific possibilities to adjust the ratio between that part of the power supplied to the melting pool and that part consumed for melting the electrodes and thus the ratio between the penetration area and the bead area.

What is claimed is:

1. A process for automatically electric arc welding two elongated work pieces together comprising in combination the steps of positioning said work pieces with an edge of one work piece abutting the other work piece and with a vertical surface of one work piece intersecting a horizontal surface of the other work piece, relatively moving a plurality of welding electrodes concurrently along the work pieces while supplying electric current to said electrodes, at least one leading electrode being positioned to deposit a first weld bead on said horizontal surface near said vertical surface to form a channel between said bead and said vertical surface and at least one succeeding electrode being positioned to lay a second weld bead in said channel, the spacing of said electrodes in a direction longitudinal of said work pieces and the rate of relative movement between said electrodes and work pieces being selected so that said first bead has substantially solidified but is still glowing when said second bead is deposited.

2. A process according to claim 1, in which slag on said first bead is allowed to remain and said second bead is deposited before said slag on said first weld bead has solidified.

3. A process according to claim 1, in which said second bead forms a corner recess between said second bead and said vertical surface and in which a third bead is deposited in said corner recess when said second bead has substantially solidified but is still glowing.

4. A method according to claim 1, in which said leading electrode is supplied with direct current of a positive polarity and said succeeding electrode is supplied with direct current of a negative polarity.

5. A method according to claim 1, in which the electric current supplied to said succeeding electrode is of the order of 85% of that supplied to said leading electrode.

6. A method according to claim 1, in which at least said first bead is deposited by the joint action of at least two electrodes operating on a common welding pool.

References Cited by the Examiner
UNITED STATES PATENTS

| | | | |
|---|---|---|---|
| 2,145,009 | 1/39 | Keir | 219—73 |
| 2,489,002 | 11/49 | Babbitt | 219—73 |
| 2,620,423 | 12/52 | Komers et al. | 219—73 |

RICHARD M. WOOD, *Primary Examiner.*